UNITED STATES PATENT OFFICE.

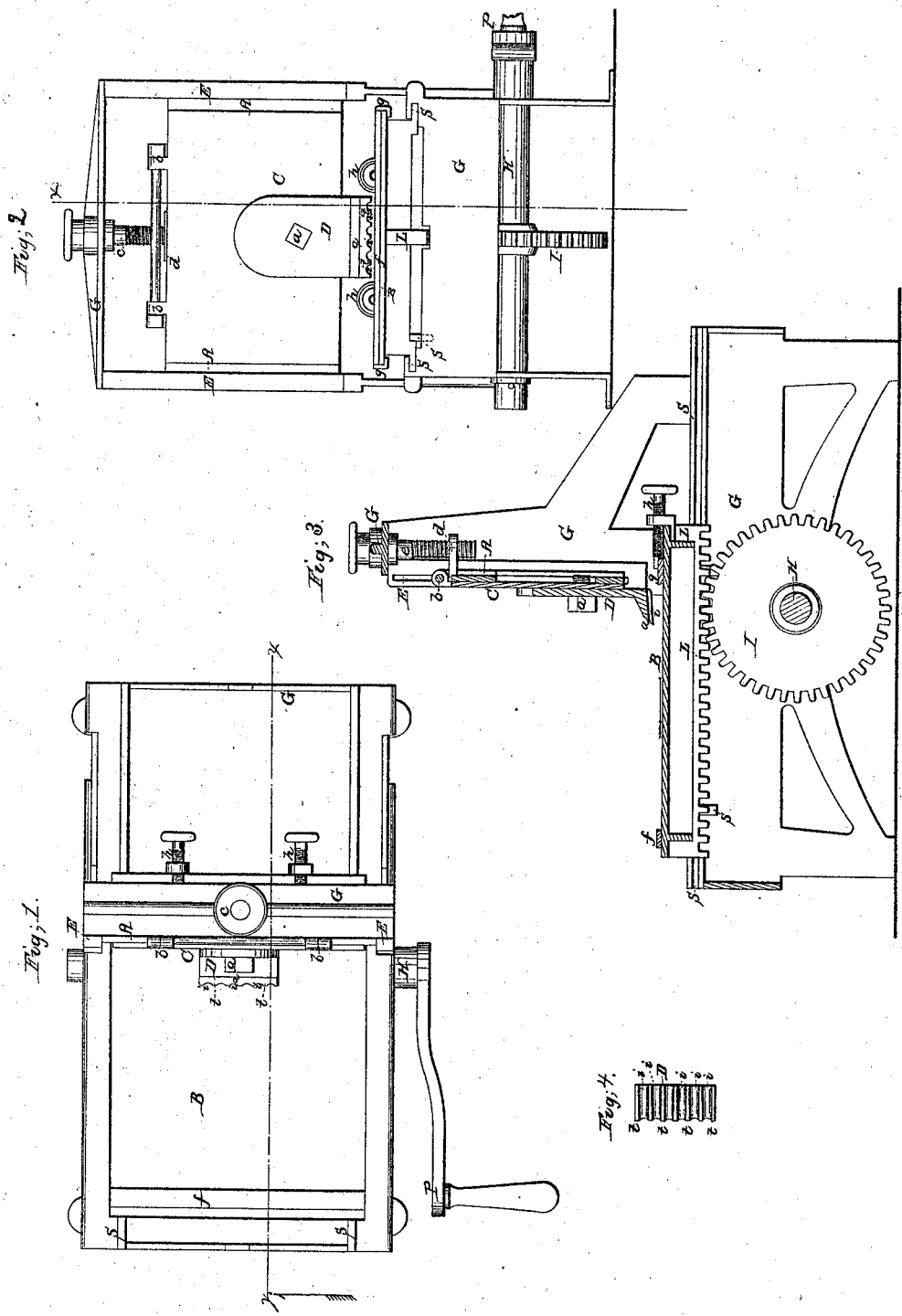

NORMAN C. HARRIS, OF POULTNEY, VERMONT.

MANUFACTURE OF SLATE-PENCILS.

Specification of Letters Patent No. 12,759, dated April 24, 1855.

*To all whom it may concern:*

Be it known that I, NORMAN C. HARRIS, of Poultney, in the county of Rutland and State of Vermont, have invented a new and useful Machine for Making Slate-Pencils; and I do hereby declare that the following is a full, clear, and exact description thereof, reference being had to the accompanying drawings, making part of this specification.

Figure 1, being a plan of the machine; Fig. 2, an end elevation of the same; Fig. 3, a vertical section thereof, in the plane $x\ x$, Figs. 1 and 2; Fig. 4, bottom view of the cutter detached.

Like letters designate corresponding parts in the several figures.

Slate pencils heretofore have been made by first preparing slabs of slate of the proper size and thickness; then cutting off therefrom strips of suitable width for single pencils, which are afterwards rounded with knives. This process is slow, causes a great waste of material, and the pencils retain a more or less irregular shape.

The nature of my invention consists in cutting numbers of slate pencils completely formed at once from slabs of slate, by means of a cutter, or series of cutters, grooved so as to half form the pencils on one side of each slab, and then reversing the slab and forming the other halves of the pencils, substantially as hereinafter set forth.

My improved machine is essentially composed of a cutter, or series of cutters, properly arranged upon a carrier which gradually descends, or is fed down upon the slabs of slate; and of a horizontal carriage, having a reciprocating motion for the purpose of carrying the slabs beneath the cutter or cutters, to be acted on by them.

Each slab of slate, split out of the proper thickness, and trimmed off to a suitable size, is placed upon the carriage B, and confined there by means of two ledges $f$ and $g$, the former being stationary and the latter arranged so as to slide toward or from the other by means of screws $h\ h$, or their equivalents. The thickness of these ledges should be less than one half that of the pencils; and their holding edges may be slightly beveled beneath, as seen in Fig. 3, so that they may hold the slabs most tightly near the middle of their thickness. The carriage slides in ways S S, in the sides of the frame G, and a reciprocating motion is given to it by means of a rack L, into which a pinion I, on the driving shaft H, takes. Said shaft may be turned partially around by a crank P, so as to give the required extent of motion to the carriage B, and then brought back in the other direction, as represented in the drawings, the motion being limited by stops $s\ s$; or it may be caused to revolve by any suitable power, and any convenient contrivance employed to produce a reciprocating motion of said carriage therefrom.

The cutter carrier A slides vertically in grooves E E, in the sides of the frame G, and is caused to descend gradually, as the slate carriage B reciprocates, by means of a screw $c$, or its equivalent, which turns in the frame, and enters a female screw $d$ in said carrier. This screw may be turned by hand, to feed the cutters down to the slate, as represented in the drawings. But it will be preferable to connect it with the motion of the carriage B, in any convenient manner, whereby it may be fed down automatically and uniformly in proportion to the motion of said carriage.

There may be a single cutter D, as represented in the drawings, of a width sufficient to cut the whole or any part of a slab, into pencils at once. On its under side, semicircular grooves $i\ i$, of the size of a pencil, are formed parallel to one another, with cutting ridges $t\ t$ between them, substantially as shown in Fig. 4. This cutter is attached by a screw $a$, or otherwise, to a plate C, which is hinged by its upper edge, at $b\ b$, to the carrier A, so that it will freely swing forward, but when hanging vertically will be in contact with the carrier, as represented in the drawings.

Instead of a single cutter, as shown, there may be a series of distinct cutters, one for each pencil, arranged side by side. This cutter, or series of cutters, may be made of steel, or of cast iron case-hardened or chilled, and kept sharp by simply grinding the beveled part $a$. The grooves $i\ i$ widen and deepen a little backward, as seen in Fig. 4, so that only the cutting edges may bear upon the slate; and the bottom of the cutter, or series of cutters, slant upward slightly, in the same direction, as seen in Fig. 3, for the same purpose, and in order that it may swing forward, when the carriage recedes, to allow the slate to be easily freed therefrom. There may also be a cutter, or series of cutters, set in the opposite direction on the same carrier, for the purpose of cutting at every motion of the carriage.

The operation of the machine is:—When the carriage B, bearing the slab of slate, moves in the direction indicated by the arrow in Fig. 3, the cutter D, bearing against its carrier A, cuts a slight depth into the slate, making grooves, or channels, at the proper distances apart for forming the individual pencils side by side. Then, as the carriage recedes, it swings the cutter away from its carrier and thereby frees it from the slate. In the meantime, the cutter carrier is moved down a little, and when the carriage again moves forward, the cutter makes the grooves a little deeper in the slate. This continues till the pencils are half formed in the face of the slab; which is then turned the other side up, and the same process repeated till the other halves of the pencils are formed, in like manner. The slabs should be of such thickness as to be just, or nearly, cut through between the pencils as soon as both sides are completely formed; and they will then separate or can be easily broken apart.

In order to bring the two sides of each pencil precisely opposite to each other, the bed of the carriage B, may be grooved so as to admit the half-formed pencils on one side of the slab and retain them while the other sides are forming; or any other convenient mode of adjustment may be adopted.

Instead of the stationary cutter, or series of cutters D, I contemplate, as a modification, if desirable, using a revolving cylindrical cutter, grooved in a corresponding manner, or a series of revolving disks, properly shaped and arranged side by side.

What I claim as my invention and desire to secure by Letters Patent, is

Cutting the pencils completely formed from slabs of slate, by means of a cutter, or series of cutters, grooved so as to half form the pencils on one side of each slab, and then reversing the slab and forming the other halves of the pencils, substantially as herein set forth.

In testimony whereof, I hereunto set my hand this 26th day of March 1855.

NORMAN C. HARRIS.

In presence of—
WILLIAM WHEELER,
JOHN W. SMITH.